United States Patent [19]

Nogawa

[11] Patent Number: 4,633,658
[45] Date of Patent: Jan. 6, 1987

[54] LAWN MOWER
[75] Inventor: Masato Nogawa, Yokosuka, Japan
[73] Assignee: Oppama Kogyo Kabushiki Kaisha, Yokosuka, Japan
[21] Appl. No.: 729,637
[22] Filed: May 2, 1985
[30] Foreign Application Priority Data
Dec. 20, 1984 [JP] Japan .................. 59-268860
[51] Int. Cl.⁴ ................ A01D 34/67; A01D 34/74
[52] U.S. Cl. .................... 56/255; 56/17.2; 56/320.2
[58] Field of Search ............ 56/12.7, 17.1, 17.2, 56/16.7, 255, 320.1, 320.2

[56]  References Cited

U.S. PATENT DOCUMENTS

| | | | |
|---|---|---|---|
| 2,648,187 | 8/1953 | Ries | 56/255 |
| 2,848,859 | 8/1958 | Abol | 56/17.2 |
| 2,894,761 | 7/1959 | Knarzer | 56/17.2 |
| 2,915,318 | 12/1959 | Chesser | 56/17.2 |
| 2,938,323 | 5/1960 | Livingston et al. | 56/17.2 |
| 4,083,168 | 4/1978 | Oscarsson | 56/320.2 |
| 4,179,805 | 12/1979 | Yamada | 56/12.7 |
| 4,224,785 | 9/1980 | Hoch | 56/320.1 |
| 4,226,021 | 10/1980 | Hoff | 56/12.7 |
| 4,232,505 | 11/1980 | Walto | 56/12.7 |
| 4,259,782 | 4/1981 | Proulx | 56/12.7 |
| 4,280,319 | 7/1981 | Scanland | 56/320.2 |
| 4,302,878 | 12/1981 | Bonforte | 56/12.7 |
| 4,389,836 | 6/1983 | Lowry et al. | 56/12.7 |
| 4,428,183 | 1/1984 | Lowry et al. | 56/17.2 |
| 4,450,673 | 8/1984 | Hutchison | 56/17.1 |
| 4,531,350 | 7/1985 | Huthmacher | 56/17.1 |

Primary Examiner—Paul J. Hirsch
Attorney, Agent, or Firm—Murray Schaffer

[57] ABSTRACT

A lawn mower formed by fitting an attachment to a conventional portable weeder. The attachment is fitted to the bearing part of the rotary shaft of the mowing blade of the portable weeder, covers the upper part of the mowing blade and is provided with vertically movable wheels on both sides of the tip part and with a discharging port in a proper position.

5 Claims, 7 Drawing Figures

LAWN MOWER

FIELD OF THE INVENTION

This invention relates to lawn mowers light in the weight, small in the size, easy to operate and simple to adjust the lawn mowing height and more particularly to a lawn mower which is formed by fitting an attachment to a conventionally provided portable weeder, can be therefore used also as a weeder and can be used not only for general domestic uses but also for professional uses.

BACKGROUND OF THE INVENTION

There has been already provided a lawn mower for general domestic uses wherein wheels are rotated by a hand push and a spirally formed mowing blade is rotated by the rotation of the wheels.

A lawn mower provided with a motor is also provided. They are so comparatively large as to be difficult to operate and have been substantially all for professional uses.

If the above mentioned conventional hand-pushed lawn mower is formed to be light in the weight, the wheels and mowing blade will not be able to be rotated. Therefore, it has been formed to be comparatively heavy to be difficult to operate.

Further, there has been a defect that, even if the lawn mower is formed to be heavy, long grasses and mowed grasses will catch or clog on the mowing blade part, the wheels will be simply stopped in the rotation and will idle and the lawn mower will not be able to be used.

The above mentioned conventional lawn mower provided with a motor is comparatively large to be difficult to operate and to use for general domestic uses.

The present invention is to solve such defects as are mentioned above.

BRIEF SUMMARY OF THE INVENTION

In the present invention, there is utilized a portable weeder having an operating rod of a proper length, a motor provided at the rear end of the operating rod and a mowing blade rotated horizontally at the tip of the operating rod by the motor and a lawn mower is formed by fitting an attachment to the bearing part of the rotary shaft of the mowing blade of the above mentioned portable weeder. This attachment covers the upper part of the mowing blade, is provided with vertically movable wheels on both sides of the tip part and has a discharging port formed in a proper position.

DETAILED DESCRIPTION OF THE EMBODIMENT

Figure 1:
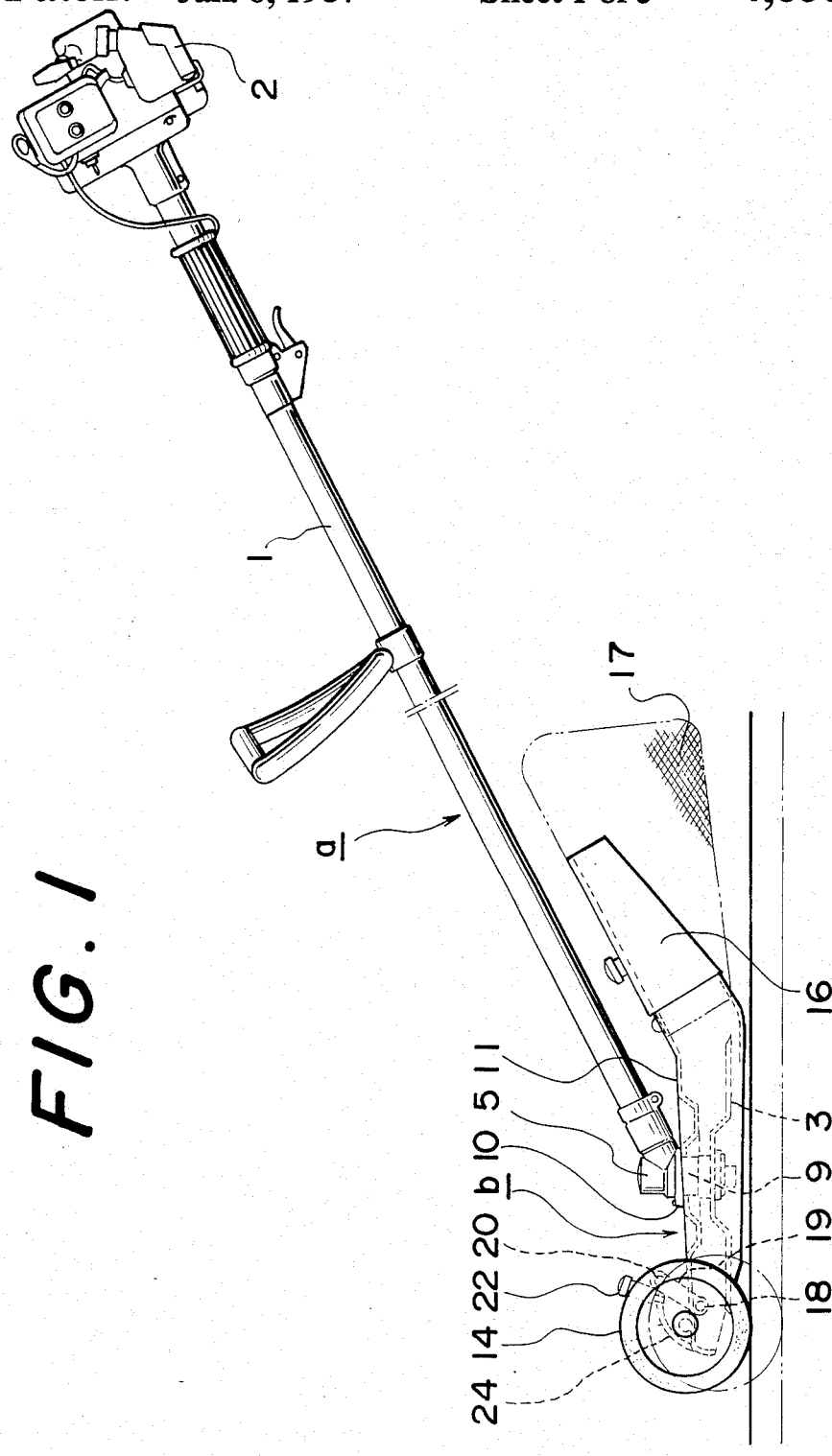
FIG. 1 is a general view.
Figure 2:
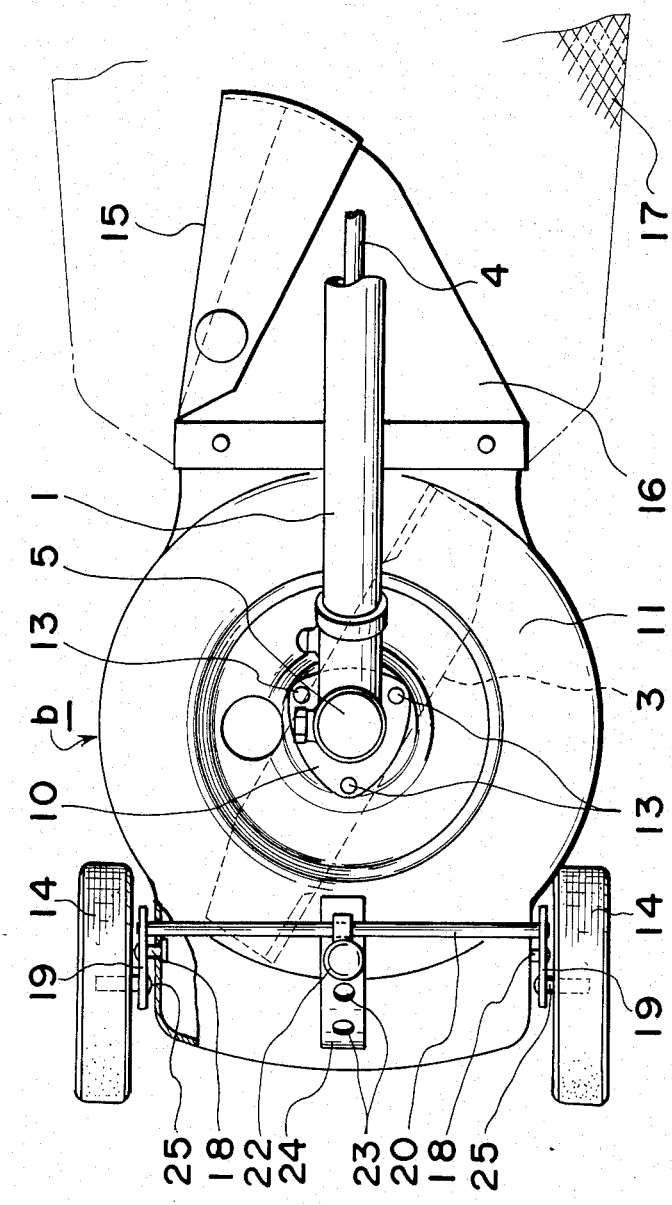
FIG. 2 is a partly cut plan view of an essential part.
Figure 3:
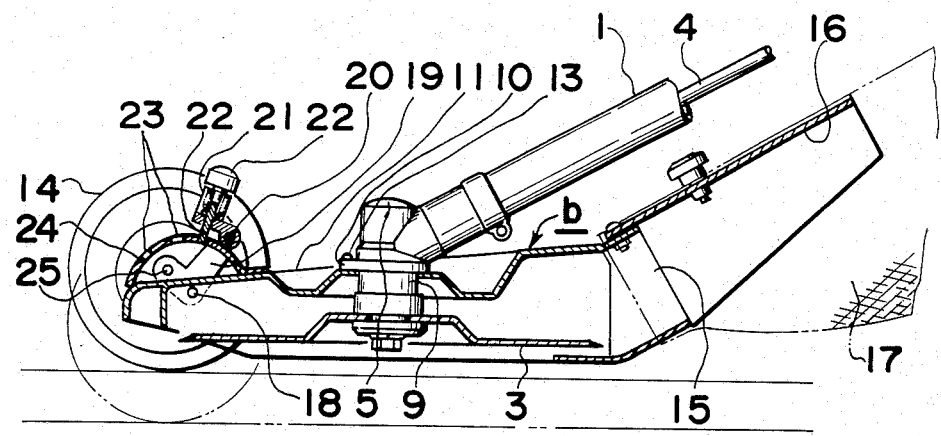
FIG. 3 is a partly sectioned view of the essential part of FIG. 2.
Figure 4:
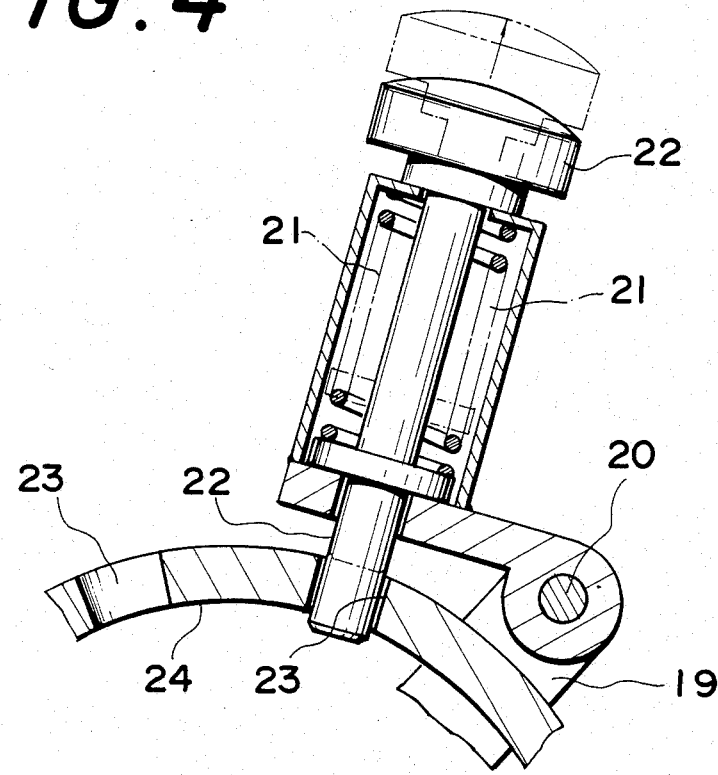
FIGS. 4 and 5 are respectively a partly magnified view and partly magnified sectioned view of FIG. 2.

In FIG. 1 showing a general view, a body a is formed of a weeder comprising an operating rod 1 of a proper length, a motor 2 provided at the rear end thereof and a mowing blade 3 rotated horizontally at the tip of the operating rod.

Figure 5:
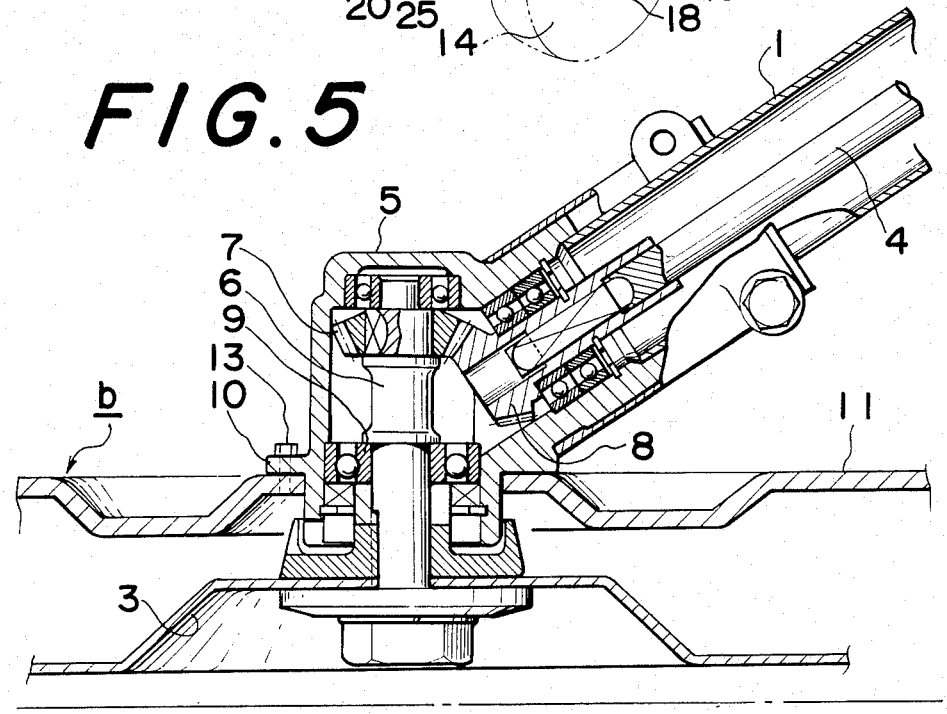

That is to say, a driving shaft 4 is extended into the operating rod 1 from the above mentioned motor 2 and a gear chamber 5 is formed at the lower end of the operating rod 1. As shown in FIG. 5, a rotary shaft 6 of the mowing blade 3 is provided within the gear chamber 5 and a bevel gear 7 provided at the upper end of the rotary shaft 6 and a bevel gear 8 provided at the lower end of the above mentioned driving shaft 4 are meshed with each other so that the mowing blade 3 may be rotated by the motor 2. The above mentioned portable weeder is entirely hung and supported with a shoulder band (not illustrated) provided from the operating rod 1 and the operating rod 6 is swung to the right and left by the operator to mow weeds.

In FIG. 5, the reference numeral 9 represents a bearing part of the rotary shaft 6 of the mowing blade 3. A flange 10 for fitting a cover provided to prevent mowed grasses or abandoned vinyl sheets from being entangled on the rotary shaft 6 part or a cover (not illustrated) provided to prevent mowed grasses from flying to the operator side is formed in the lower part of the outside of the gear chamber 5 of the above mentioned portable weeder.

In the present invention, the above mentioned flange 10 is utilized to fit an attachment b.

Figure 6:
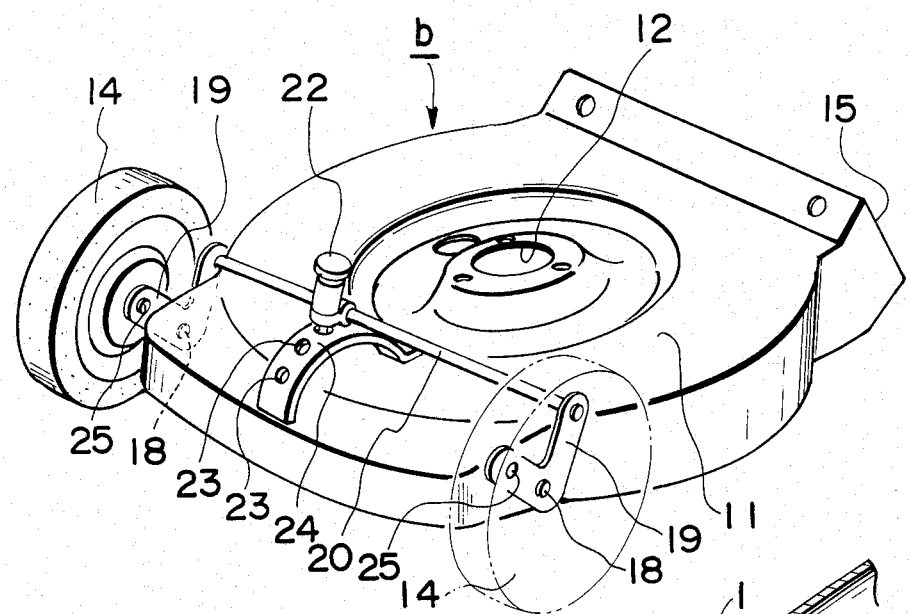
FIG. 6 is a perspective view of the attachment.

The attachment b shall be described in the following. As shown particularly in FIG. 6, the attachment b is formed as a main body of a cover 11 covering the upper part of the mowing blade 3, is provided substantially in the central part of the cover 11 with a hole 12 fitting the above mentioned bearing part 9. As shown in FIGS. 1, 2, 3 and 5, the cover 11 part is fitted to the bearing part 9 by locking bolts 13 screwed to the above mentioned flange 10.

Further, in the attachment b, concretely, vertically movable wheels 14 are provided on both sides of the tip part of the cover 11 and a discharging port 15 is formed in a proper position, that is, in the rear in the drawing in the case of the embodiment.

In the drawing, the reference numeral 16 represents a guiding duct connected to the discharging port 15 and the reference numeral 17 represents a grass collecting bag.

Now, the above mentioned vertically movable wheels 14 shall be described. The wheels 14 are made movable vertically to the attachment b or, concretely, to the cover 11 so that, as a result, the lawn mowing height may be adjusted.

In the actual case of the above mentioned vertical movement, a supporting plate 19 made rockable by being borne in the central part by a supporting shaft 18 is provided on each of both sides of the tip part of the cover 11, the wheel 14 is fitted through an axle 25 at the tip of each of the supporting plates 19 and the respective supporting plates 19 are connected with each other at the rear ends through a shaft 20. When the shaft 20 is moved forward or rearward and is fixed, the wheels 14 will be vertically movable and will be set in predetermined positions through the supporting plates 19 and will be adjusted in the height.

That is to say, by the movement of the shaft 20, the wheels 14 at the tips of the supporting plates 19 will be moved vertically to the cover 11 forming the attachment b respectively with the supporting shafts 18 as axes.

Now, the case of fixing the above mentioned shaft 20 in a predetermined position shall be described. In the case of the embodiment in the drawing, a locking rod 22 projected by the force of a spring 21 is provided in a proper position of the shaft 20 and a guide stopper 24 having a proper number of holes 23 in which the locking rod 22 is to be fitted and locked is provided on the cover 11 side so that, by fitting the locking rod 22 in the hole 23 of the guide stopper 24, the shaft 20 may be fixed in a predetermined position.

When the shaft 20 is thus fixed, the wheels 14 will be set in a predetermined position.

By the way, it is needless to say that the above mentioned guide stopper 24 is provided in conformity with the track of the shaft 20 having the supporting shafts 18 of the supporting plates 19 as axes and the track of the locking rod 22.

In the present invention, the above mentioned attachment b is fitted to the bearing part 9 of the driving shaft 4 of the mowing blade 3 of the body a.

That is to say, the cover 11 forming the attachment b is fitted in the substantially central hole 12 to the bearing part 9 of the driving shaft 4 of the above mentioned mowing blade and is attached with the locking bolts 13 to the flange 10 provided in the lower part of the outer periphery of the bearing part 9.

Then, the height of the vertically movable wheels 14 provided on both sides of the tip part of the cover 11 is adjusted to fit the lawn mowing height.

That is to say, in the case of the embodiment in the drawing, the locking rod 22 is retracted, is slid along the guide stopper 24 and is fitted and locked in the hole 23 in a proper position.

As a result, the supporting plates 19 will be rotated respectively with the supporting shafts 18 as axes and the wheels 14 at the tips of the supporting plates 19 will be vertically moved and will be set at a predetermined height. In such state, the mowing blade 3 may be rotated by the motor 2 and may be run on the lawn surface.

The present invention is of a two-wheel type wherein the wheels 14 are provided on both sides of the tip part of the attachment b and is very high in the operability.

That is to say, as different from a three-wheel or four-wheel type, the lateral feeding is very easy in the present invention.

Figure 7:
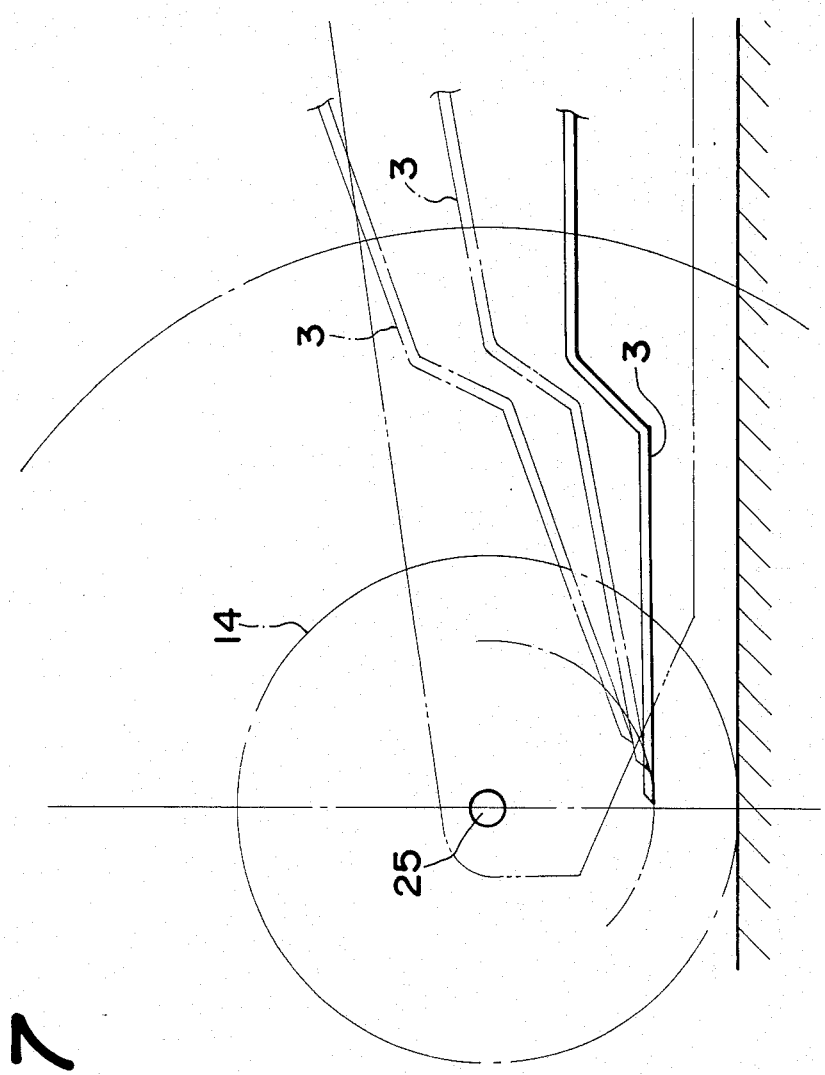
FIG. 7 is an explanatory view showing the relation between the wheel and mowing blade.

Further, if the size (length) of the mowing blade 3 is adjusted so that, as shown in FIG. 7, the tip part of the mowing blade 3 may be substantially in the vertical line position of the axle 25 of the above mentioned wheel 14, irrespective of the vertical movement of the operating rod 1, the movement of the tip part of the mowing blade 3 will be so small that an effect of being able to reduce the fluctuation of the lawn mowing height will be obtained.

As mentioned above, a lawn mower is made by fitting an attachment to a conventionally provided portable weeder.

Therefore, all the device need not be made but the attachment may be made to economically utilize the portable weeder.

There are also obtained effects that the lawn mower of the present invention is formed to be light and small in spite of having the motor, is very simple to operate and is easy to adjust the lawn mowing height.

I claim:

1. Lawn cutting apparatus comprising a portable power weeder having an elongated rod-like handle, a motor mounted at the rear end of said handle, a rotatable cutting blade operatively connected to the motor and journalled at the forward end of said handle in a bearing extending at an angle to said handle, and a separable carriage comprising a rigid cover removably mounted to the bearing and fitting over and peripherally enclosing said cutting blade, said cover having a discharge port along the rear edge thereof for removing cuttings and a single pair of wheels journaled at the forward end about a horizontal axis spaced forwardly of said bearing so that said apparatus can be pushed along the ground and said rotary cutting blade swung about said wheel axis through manipulation of said handle, said cutting blade and said wheel axis being arranged so that the peripheral tip of said cutting blade extends substantially to the vertical plane containing said wheel axis whereby fluctuation of the mowing height is reduced during operation of said apparatus.

2. The apparatus according to claim 1 wherein said bearing is formed with a radially outward flange and said cover is formed with a central hole through which said bearing passes, said hole having a peripheral flange mating with said bearing flange, and including removable bolt means to secure said bearing and cover together.

3. The apparatus according to claim 2 including means for simultaneously adjusting the relative positions of the wheel axis and the cover to vary the height of said cutting blade above the ground.

4. The apparatus according to claim 2 wherein said wheels are each journalled about a stub axle fixedly secured in a bell crank, said bell crank being pivoted about an axle secured to said cover, and being fixedly connected to the other bell crank by a rod, and means for securing said connecting rod in selected positions as said bell cranks are rotated.

5. The apparatus according to claim 2 including bag means mountable on said discharge port for collecting the cuttings.

* * * * *